United States Patent
Burcham et al.

(12) 
(10) Patent No.: US 11,157,925 B1
(45) Date of Patent: Oct. 26, 2021

(54) SYSTEM AND METHOD OF MOBILE PHONE LOCATION IN A SUBWAY TRANSIT ENVIRONMENT

(71) Applicant: T-MOBILE INNOVATIONS LLC, Overland Park, KS (US)

(72) Inventors: Robert H. Burcham, Overland Park, KS (US); Matthew Habiger, Kansas City, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 360 days.

(21) Appl. No.: 16/379,791

(22) Filed: Apr. 9, 2019

(51) Int. Cl.
   *H04W 4/021* (2018.01)
   *G06Q 30/02* (2012.01)
   *G01C 21/20* (2006.01)
   *H04W 4/029* (2018.01)

(52) U.S. Cl.
   CPC ....... *G06Q 30/0201* (2013.01); *G01C 21/206* (2013.01); *H04W 4/021* (2013.01); *H04W 4/029* (2018.02)

(58) Field of Classification Search
   CPC .. G06Q 30/0201; H04W 4/029; H04W 4/021; G01C 21/206
   See application file for complete search history.

(56) References Cited

U.S. PATENT DOCUMENTS

2016/0091593 A1* 3/2016 Millman ............... H04W 4/029
                                                        701/468
2017/0171720 A1* 6/2017 Holleczek ............... H04W 8/08

* cited by examiner

*Primary Examiner* — Mohamed Charioui
*Assistant Examiner* — Christine Y Liao (57) ABSTRACT

A method of determining traffic in a subway system. The method comprises analyzing a first type of location data associated with mobile communication devices to determine subway entry points and subway exit points of the devices, analyzing different pairs of entry and exit points to infer probabilities that a device transits between a pair of entry points by different routes based on a WiFi SSID included in the first type of location data, analyzing a second type of location data associated with mobile communication devices to identify entry and exit points of the devices based on a cell site identity included in the second type of location data, for each pair of entry point and exit point associated with the second type of location data, determining a fractional route count for the device transiting between the entry and exit points for each different subway route based on the inferred probabilities.

20 Claims, 7 Drawing Sheets

SYSTEM AND METHOD OF MOBILE PHONE LOCATION IN A SUBWAY TRANSIT ENVIRONMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Geolocations of mobile communication devices can serve as proxies for geolocations of human beings. By determining the geolocation of mobile communication devices at specific times, storing this time-associated geolocation data in a data store, and analyzing the geolocation data, a variety of useful information can be generated. For example, a rate of human beings traversing an area at specific times of day and days of the week can be inferred. A speed of human beings (e.g., the cars which the human beings are driving or riding in) traversing an area can be inferred.

SUMMARY

In an embodiment, a method of analyzing location data received from locating mobile communication devices to infer probabilities of taking different subway routes when transiting from a first subway entrance to a second subway entrance and analyzing location data from subway enabled mobile communication devices based on the inferred probabilities to determine traffic at points-of-interest in a subway system is disclosed. The method comprises receiving location data of a first type from a plurality of locating mobile communication devices, where the locating mobile communication devices each have a location capture and report application installed, where some of the first type of location data comprises a timestamp and at least one signature of an underground radio source located in the subway system, and where some of the first type of location data comprises a timestamp and an identity of a cell site proximate to a subway system entrance and analyzing the first type of location data that comprise the identity of a cell site proximate to the subway entrance received from the plurality of locating mobile communication devices by an analysis application executing on a computer system to determine associated subway entry points and subway exit points of the locating mobile communication devices, where at least some of the associated subway entry points and subway exit points are connected by at least two different underground routes. The method further comprises analyzing each different pair of associated subway entry points and subway exit points that are connected by at least two different underground routes by the analysis application to infer probabilities that a mobile communication device transits between a pair of associated subway entry points by the different underground routes based on the signature of the at least one underground radio source, where the at least one underground radio source is located at a predefined location in the subway system, and accessing location data of a second type associated with a plurality of subway enabled mobile communication devices, where each subway enabled mobile communication device has a subway system application installed and where the second type of location data comprises a timestamp and an identity of a cell site proximate to a subway system entrance. The method further comprises analyzing the second type of location data by the analysis application to identify subway entry points and subway exit points of the subway enabled mobile communication devices, for each pair of subway entry point and subway exit point of each subway enabled mobile communication device, determining by the analysis application a fractional route count for the device transiting between the pair of entry and exit points for each different subway route between the pair of entry and exit points based on the inferred probabilities, and determining traffic at each of a plurality of points-of-interest (POIs) located in the subway system by the analysis application based on the fractional route count.

In another embodiment, a system for analyzing location data received from locating mobile communication devices to infer probabilities of taking different subway routes when transiting from a first subway entrance to a second subway entrance and analyzing location data from subway enabled mobile communication devices based on the inferred probabilities to determine traffic at points-of-interest in a subway system. The system comprises at least one processor, a non-transitory memory, a data store, and an analysis application stored in the non-transitory memory. The data store comprises location data of a first type associated to a plurality of locating mobile communication devices, where the locating mobile communication devices each have a location capture and report application installed, where some of the first type of location data comprises a timestamp and at least one service station identity (SSID) of a WiFi access point (AP) located in the subway system and where some of the first type of location data comprises a timestamp and an identity of a cell site proximate to a subway system entrance. The data store further comprises location data of a second type associated with a plurality of subway enabled mobile communication devices, where each subway enabled mobile communication device has a subway system application installed and where the second type of location data comprises a timestamp and an identity of a cell site proximate to a subway system entrance. When executed by the processor, the analysis application analyzes the first type of location data that comprise the identity of a cell site proximate to the subway entrance received from the plurality of locating mobile communication devices to determine associated subway entry points and subway exit points of the locating mobile communication devices, where at least some of the associated subway entry points and subway exit points are connected by at least two different underground routes. The analysis application also analyzes each different pair of associated subway entry points and subway exit points that are connected by at least two different underground routes to infer probabilities that a mobile communication device transits between a pair of associated subway entry points by the different underground routes based on SSIDs of WiFi APs of the first type of location data, where the WiFi APs are located at predefined locations in the subway system. The analysis application also analyzes the second type of location data to identify subway entry points and subway exit points of the subway enabled mobile communication devices, for each pair of subway entry point and subway exit point of each subway enabled mobile communication device, determines a fractional route count for the device transiting between the pair of entry and exit points for each different subway route between the pair of entry and exit points based on the inferred probabilities, and determines traffic at each of a plurality of points-of-interest (POIs) located in the subway system based on the fractional route count.

In yet another embodiment, a method of analyzing location data received from locating mobile communication devices to infer probabilities of taking different subway routes when transiting from a first subway entrance to a second subway entrance and analyzing location data from subway enabled mobile communication devices based on the inferred probabilities to determine traffic at points-of-interest in a subway system is disclosed. The method comprises analyzing a first type of location data associated with mobile communication devices that comprise an identity of a cell site proximate to a subway entrance by an analysis application executing on a computer system to determine associated subway entry points and subway exit points of the mobile communication devices and analyzing different pairs of associated subway entry points and subway exit points by the analysis application to infer probabilities that a mobile communication device transits between a pair of associated subway entry points by different underground routes based on an SSID of a WiFi AP included in the first type of location data, where the WiFi APs are located at predefined locations in the subway system. The method further comprises analyzing a second type of location data associated with mobile communication devices by the analysis application to identify subway entry points and subway exit points of the mobile communication devices based on a cell site identity included in the second type of location data. The method further comprises, for each pair of subway entry point and subway exit point associated with the second type of location data, determining by the analysis application a fractional route count for the device transiting between the pair of entry and exit points for each different subway route between the pair of entry and exit points based on the inferred probabilities and determining traffic at each of a plurality of points-of-interest (POIs) located in the subway system by the analysis application based on the fractional route count.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Location data pertaining to mobile communication devices can be collected by wireless communication service providers and analyzed to derive valuable information on the presence, dwell times, and movements of human beings. This information can be used to plan and adapt highway systems, construction plans, and business plans. This information can be used to establish values and prices for presenting content on billboards and on digital screens outside of the home. It is observed that in such analysis, the location of the mobile communication device serves as a proxy for the geolocation of the human being using the mobile communication device.

In many cases the location data is created in response to some communication event, for example the mobile communication device transmitting a text message, establishing a data session to access an application server, or other communication event. The location of the device may be determined by identifying a cell site (e.g., the serving cell site) to which the device is attached for receiving wireless communication service and using the location of the cell site as a proxy for the location of the device, possibly adjusted based on a cell sector the device is communicating through. The location of the device may be determined by multilateration techniques or by trilateration techniques involving analyzing a strength of a signal emitted by the device received by a plurality of cell sites and using those signal strength values and known locations of the cell sites to estimate the location of the device. The location of the device may be reported by the device itself, for example in support of receiving location based services, and may be provided in the form of GPS coordinates. In each of these cases the mobile communication device is able to communicate with the radio access network (RAN) of the wireless communication system.

In a subway environment, however, mobile communication devices typically are out of radio coverage from cell sites and hence location information for the devices while they are traveling in the subway has been unavailable. The present disclosure teaches a system and method for inferring locations of mobile communication devices (and hence, by proxy, inferring the location of the users of the devices) while they are traveling in a subway based on the last location data collected for a device before it enters the subway and the first location data collected for the device after it exits the subway. A subway entrance where a device enters the subway can be determined based on a location data report that identifies a cell site that is proximate to the subway entrance in combination with the loss of RF signal of the device from the RAN. This conclusion can be corroborated further by the presence of a subway mobile application being installed on the device. A subway entrance where the device leaves the subway can be determined in a like manner based on a location data report that identifies a cell site that is proximate to a different subway entrance combined with the circumstance of the recovery of the RF signal of the device by the RAN. Alternatively, or in addition, the subway entrance where a device enters the subway can be determined based in part on the device beginning to roam on a distinctive cellular radio system installed to operate in the subway system. Such a distinctive cellular radio system may be operated by a city that operates the subway system or by a network operator different from the wireless service provider(s) that offers cellular coverage above ground, out of the subway system. The subway entrance where a device leaves the subway can be determined based in part on the device stopping roaming on the distinctive cellular radio system installed to operate in the subway system.

Because multiple different subway paths may be followed to get from a first point to a second point in the subway, further analysis is desired to take account of the alternative transit routes. A plurality of mobile communication devices have a location software development kit (SDK) mobile application installed that collects and transmits self-location data to a location data store of a wireless communication service provider. For example, the devices having the location SDK may collect and store information on SSIDs of WiFi access points (APs) that the devices come in range of. Some subways systems have WiFi APs installed at subway stations. When the devices having the location SDK transit the subway system, they collect WiFi SSIDs and transmit this information to the location data store when they exit the subway and are back on the RAN.

In some cases, a distinctive cellular radio system may be installed to operate in the subway system below ground. For example, a city may own and operate an independent cellular radio access network (RAN) in the subway system, and wireless communication service providers may leverage that independent cellular RAN by provisioning their subscriber's mobile communication devices for roaming on the independent cellular RAN. In this case, the radio signals of the independent cellular RAN may be detected by the devices having the location SDK, and the devices having the location SDK may capture information about a radio transceiver of the independent cellular RAN and transmit that information to the location data store. The information may comprise an identity of a cell site of the independent cellular RAN. The information may comprise a characteristic radio frequency used by the independent cellular RAN. The information may comprise information about a radio protocol used by the independent cellular RAN.

In some cases, signage located at subway stations may be associated with radio beacons, and the devices with the location SDK may collect and store information on the identities of the radio beacons they detect and can transmit that information also to the location data store. In some cases, technical infrastructure in the subway system may transmit characteristic radio signals, and the devices with the location SDK may detect these characteristic radio signals, collect information related to these radio signals (e.g., broadcast identities, frequency range, radio protocol employed, and/or other characteristics of these radio signals). The devices with the location SDK can then transmit this collected radio signal information to the location data store. Subway system infrastructure radio emitters may be radios used in operating and managing the subway system. The information about WiFi SSIDs, independent cellular RAN radio signals, radio beacons, and/or subway infrastructure radio emitters observed or detected by the device serve as a bread crumb trail that can be used by an analysis application executing on a computer system to determine a specific path among many alternative possible paths to transit the subway from a first point to a second point.

The analysis application can perform statistical analysis of the subway transits of the plurality of mobile communication devices that have the location SDK to derive probabilities for different pathways between specific entrances of the subway system. In this case, when a mobile communication device that does not have the location SDK installed transits the subway system from the first point to the second point, the analysis application attributes fractional credit of the device transiting on each of the possible paths, based on the statistics. The traffic through each of the paths can be calculated by the analysis application as the sum of the fractional credit for each path. The credit for mobile communication devices transiting the subway by specific paths can be used to adapt the subway system, to plan subway car service, to plan business projects. The credit for mobile communication devices transiting the subway by specific paths can be used to count intersections of devices with specific points-of-interest (POIs) located in the subway, for example presentation screens located at the subway stations, posters located at the subway stations, and the like.

The analysis application may analyze the subway transits of the mobile communication devices that have the location SDK based on time of day to determine the probabilities for different pathways between specific entrances of the subway system for different times of day. Said in other words, the analysis application may determine the probabilities of traveling by different pathways between a first subway entrance and a second subway entrance for each of four different time periods of a day. The analysis application may determine the probabilities of traveling by different pathways between a first subway entrance and a second subway entrance for each of 24 different hours of a day. The analysis application may take into account published subway timetables and/or schedules in determining the probabilities for different pathways traveled by devices that do not have the location SDK installed.

Figure 1:
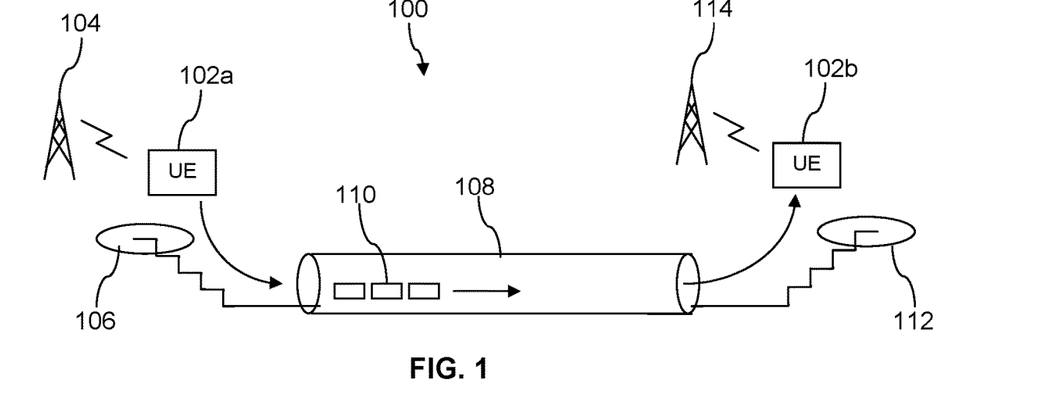
FIG. 1 is an illustration of a communication system according to an embodiment of the disclosure.

Turning now to FIG. 1, a system 100 is described. In an embodiment, the system 100 comprises a user equipment (UE) 102 that is associated with a user who transits a subway system 108 riding in a subway car 110 from a first subway entrance 106 to a second subway entrance 112 (e.g., the user enters the subway 108 at entrance 106 and exits the subway 108 at entrance 112). The UE 102 may be a mobile phone, a smart phone, a personal digital assistant (PDA), a wearable computer, a headset computer, a laptop computer, a notebook computer, or a tablet computer. A first cell site 104 is proximate to the first subway entrance 106; a second cell site 114 is proximate to the second subway entrance 112. The UE 102a is shown in radio communication with the first cell site 104 prior to entering the subway 108 and losing radio communication with a radio access network (RAN) of a wireless communication service provider as a result of going below ground, out of radio coverage. The UE 102b is shown in radio communication with the second cell site 114 just after exiting the subway 108 and reestablishing radio communication with the RAN.

Figure 2:
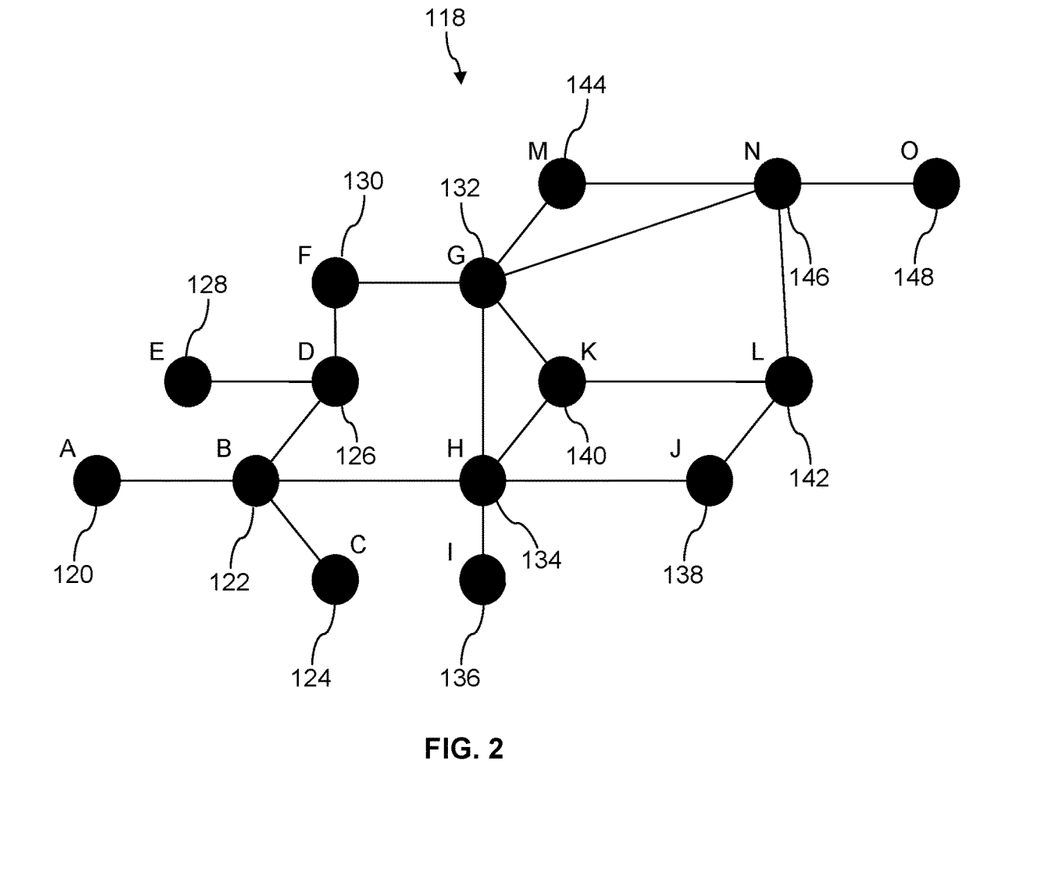
FIG. 2 is an illustration of a subway system according to an embodiment of the disclosure.

Turning now to FIG. 2, a subway transit map 118 is described. The subway transit map 118 abstractly represents subway stations as black dots and routes between subway stations as line segments. The map 118 comprises a first subway station 120 labeled as station A, a second subway station 122 labeled as station B, a third subway station 124 labeled as station C, a fourth subway station 126 labeled station D, and a fifth subway station 128 labeled as station E. The map 118 further comprises a sixth subway station 130 labeled as station F, a seventh subway station 132 labeled as station G, an eighth subway station 134 labeled as station H, a ninth subway station 136 labeled as station I, and a tenth subway station 138 labeled as station J. The map 118 further comprises an eleventh subway station 140 labeled as station K, a twelfth subway station 142 labeled as station L, a thirteenth subway station 144 labeled as station M, a fourteenth subway station 146 labeled as station N, and a fifteenth station 148 labeled as station O.

It is noted that the map 118 is not intended to represent any specific city's subway map but rather to illustrate that between any two subway stations there may be a plurality of different routes that can be followed. For example, to travel from station B to station M, the UE 102 may transit a route or path from B-D-F-G-M. Alternatively, to travel from station B to station M, the UE 102 may transit a route or path from B-H-G-M. Alternatively, to travel from station B to station M, the UE 102 may transit a route or path from B-H-J-L-N-M. There are other routes or paths that may be followed to transit form station B to station M. Each link between a first subway station and another subway station may be referred to as a route segment.

Figure 3:
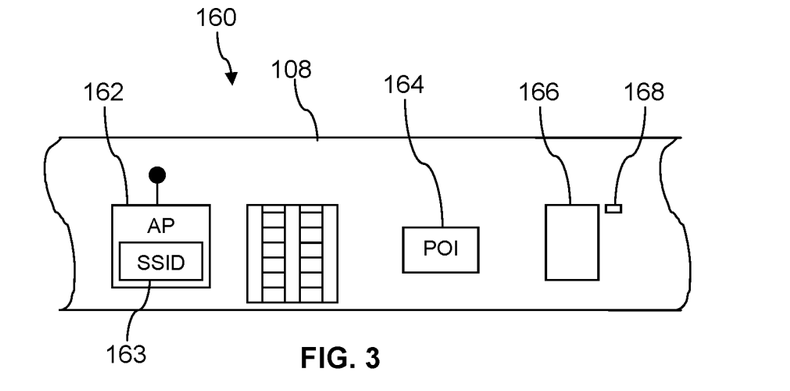
FIG. 3 is an illustration of a subway station according to an embodiment of the disclosure.

Turning now to FIG. 3, a subway station 160 is described. In an embodiment, the subway station 160 comprises a WiFi access point (AP) 162 having a SSID 163, at least one point-of-interest (POI) 164, and an item of signage 166 associated with a radio beacon 168. In some cases, there may be no signage 166 or radio beacon 168 present at the subway station 160. The POI 164 may be a presentation screen on a wall of the subway station that presents ads and/or public service announcements. It is desirable to count intersections of UEs 102 with the POI 164, for example to count a number of user experiences of the presented content for purposes of valuing the content presentation and/or setting a market value for presenting content on the display screen of the POI 164.

Figure 4A:
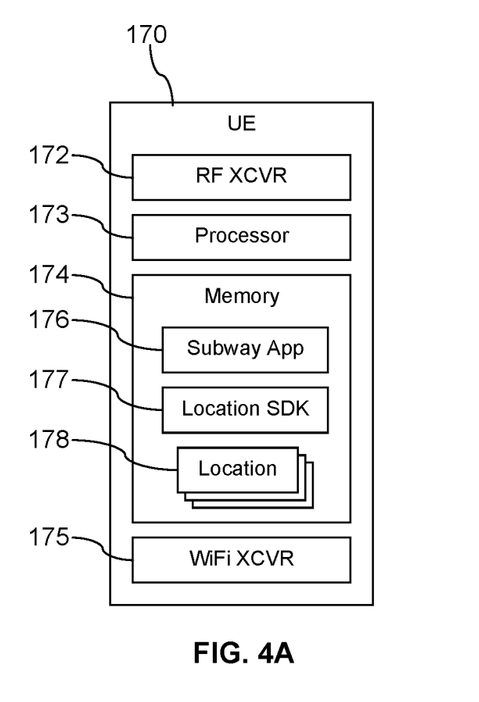
FIG. 4A is a block diagram of mobile communication device according to an embodiment of the disclosure.

Turning now to FIG. 4A, a UE 170 is described. The UE 170 may be a mobile phone, a smart phone, a personal digital assistant (PDA), a wearable computer, a headset computer, a laptop computer, a notebook computer, or a tablet computer. In an embodiment, the UE 170 comprises a radio transceiver 172, a processor 173, a memory 174, and a WiFi radio transceiver 175. The memory 174 includes a non-transitory portion that stores a subway application 176, a location SDK 177, and a plurality of location data items 178. The subway application 176 provides functionality in support of using the subway 108, for example a fare payment mechanism. The UEs 170 that have the subway application 176 may be said in some contexts to be subway enabled UEs or subway enabled mobile communication devices. The location SDK 177 provides various location capture functions, for example capturing a current location of the UE 170, storing that location information along with a current timestamp in the location data item 178, and transmitting the location data items 178 to a data store in a wireless communication service provider's network. In some contexts, the UE 170 having the location SDK 177 may be referred to as a locating mobile communication device.

Figure 4B:
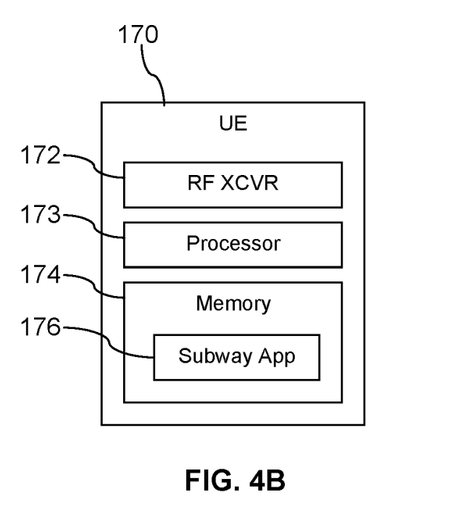
FIG. 4B is a block diagram of another mobile communication device according to an embodiment of the disclosure.

Turning now to FIG. 4B, a UE 170 is described. The UE 170 may be substantially similar to the UE 170 of FIG. 4B, with the exception that it does not comprise the location SDK 177 and does not comprise any location data items 178.

Figure 5A:
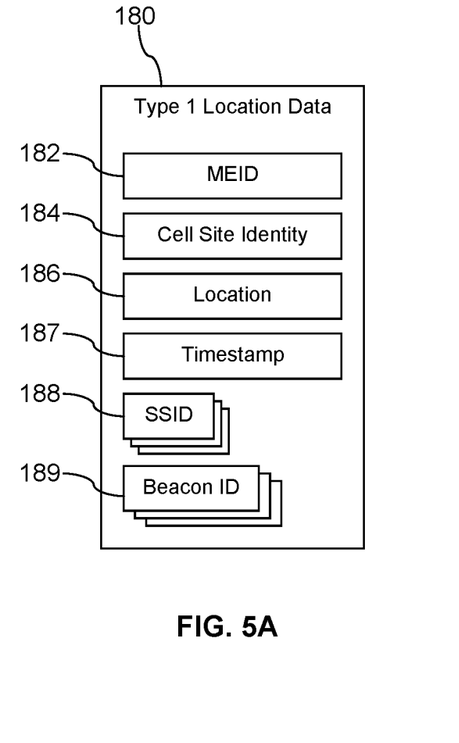
FIG. 5A is a block diagram of a first type of location data according to an embodiment of the disclosure.

Turning now to FIG. 5A, a type 1 location data 180 is described. The type 1 location data 180 may be referred to in some contexts as a type 1 location data item, a type 1 location data structure, or a type 1 location data object. In an embodiment, the location data items 178 described above with reference to FIG. 4A are structured like the type 1 location data 180. In an embodiment, the type 1 location data 180 comprises a mobile equipment identity (MEID) 182, a cell site identity 184 (an identity of a cell site operated by either a conventional wireless communication service provider or operated by a distinctive cellular radio operator), a location 186, a timestamp 187, one or more SSIDs 188, and one or more wireless beacon identities 189. The type 1 location data 180 may comprise information about a radio signal emitted by subway system infrastructure such as a broadcast identity, a radio frequency range, a radio protocol, and/or other radio characteristics.

In some instances, one or more of the components of the type 1 location data 180 may be blank or have a null value. For example, a type 1 location data 180 created by the UE 170 having the location SDK 177 while traveling in the subway 108 may have a null value in its cell site identity 184 because the UE 170 may be out of RAN wireless coverage while underground in the subway 108. For example, a type 1 location data 180 created by the UE 170 having the location SDK 177 while traveling in the subway 108 may have a null value in its location 186 because the UE 170 may not be able to determine its location while traveling in the subway 108 (e.g., when a GPS receiver of the UE 170 is out of GPS satellite signal coverage and out of RAN wireless coverage). For example, a type 1 location data 180 created by the UE 170 having the location SDK 177 while traveling in the subway 108 may have a null value for a beacon ID 189 because no radio beacons were detected by the UE 170. For example, a type 1 location data 180 created by the UE 170 having the location SDK 177 while outside of the subway 108 may have a null value for a SSID 188 because no WiFi APs 162 were detected by the UE 170, for example while driving in a vehicle on an interstate highway.

The location 186 may comprise a latitude-longitude value pair, a geohash value, or a value in a different location designation format. The timestamp 187 comprises a value indicating a date and a time. In an embodiment, the type 1 location data 180 may identify the UE 170 using an identity different from the MEID 182, for example by a mobile dialing number (MDN—e.g., a phone number), a mobile subscriber number (MSN—e.g., a phone number), an electronic serial number (ESN), or other identity.

The location SDK 177 may periodically create the type 1 location data 180 and store that data on the UE 170, for example every 10 seconds, every minute, every 5 minutes, every 15 minutes, or on some other periodic rate. A benefit provided by the location SDK 177 is that location data may be collected more frequently than is typical for a UE 170 that does not have the location SDK 177 installed. Additionally, the location information may be determined by the location SDK 177 and/or the UE 170 itself, without burdening the wireless communication service provider's server computers with performing complex and time consuming computer calculations to derive the location of the UE 170. The UE 170 determining its own location may be considered to be a kind of edge computing. Additionally, the location determined by the UE 170 may be more accurate than locations determined by analysis in the network. The UE 170 may determine its location with a GPS receiver located on the UE 170, and that GPS locating may provide more accurate location information than is possible through other locating techniques performed in the network, for example using trilateration techniques or for example using a location of a cell site to which the UE 170 is attached as a proxy for the location of the UE 170.

The location SDK 177 may transmit the type 1 location data 180 it has created and stored periodically to a data store (for example, the location data store 116 of FIG. 6 discussed hereinafter). When the UE 170 having the location SDK 177 is out of RAN coverage, for example while traveling in the subway 108, the type 1 location data 180 is stored in the memory 174 of the UE 170. When the location SDK 177 determines that the UE 170 has reattached to the RAN, the location SDK 177 may transmit the accumulated type 1 location data 180 to the data store.

Figure 5B:
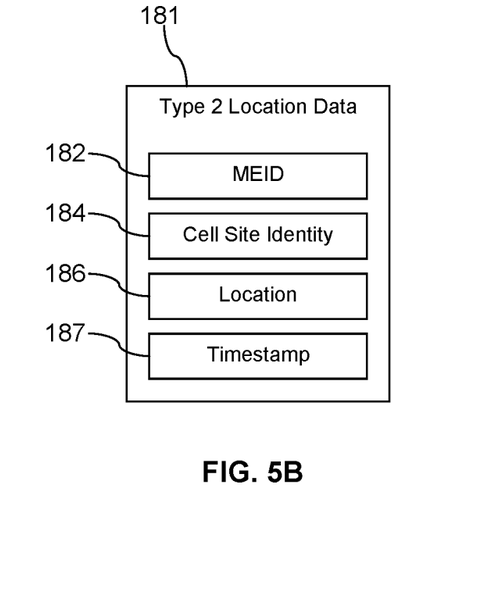
FIG. 5B is a block diagram of a second type of location data according to an embodiment of the disclosure.

Turning now to FIG. 5B, a type 2 location data 181 is described. The type 2 location data 181 may be referred to in some contexts as a type 2 location data item, a type 2 location data structure, or a type 2 location data object. The type 2 location data 181 has the MEID 182, the cell site identity 184, the location, and the timestamp 187 described with reference to FIG. 5A but does not comprise the SSID 188 or the beacon ID 189. The type 2 location data 181 may be created by a location application executing on a computer system in a wireless communication service provider's network based on information provided by cell sites. The location application executing in the service provider's network may determine the location of the UE 170 based on signal strength information provided by cell sites proximate to the UE 170 using trilateration techniques. The location application executing in the service provider's network may determine the location of the UE 170 based on using the location of a serving cell site as a proxy for the location of the UE 170. The type 2 location data 181 may be created on the event of specific communication events being initiated by the UE 170, for example on the event of the UE 170 sending a text message, on the event of the UE 170 establishing a data session connection, or on another event. The type 2 location data 181 may be created on the event of the UE 170 sending location information pursuant to location based services. The type 2 location data 181 may be created infrequently and at non-periodic time intervals. The type 2 location data 181 may be stored in the same data store where the type 1 location data 180 is stored.

Figure 6:
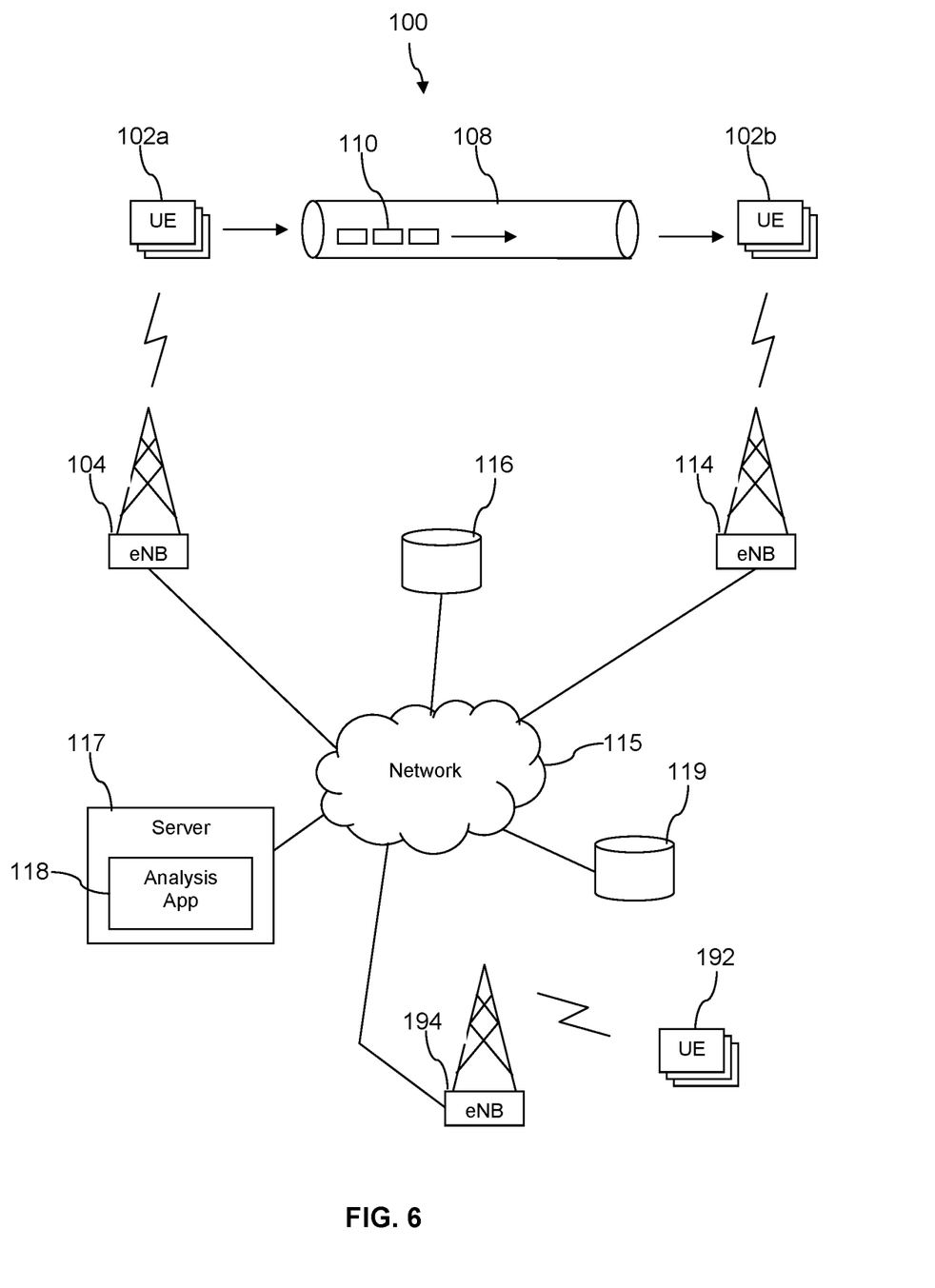
FIG. 6 is an illustration of a communication system according to an embodiment of the disclosure.

Turning now to FIG. 6, further details of the communication system 100 are described. In an embodiment, the cell sites 104, 114 provide communications coupling of the UE 102 and cell site 194 provides communications coupling of a plurality of UEs 192 to a network 115. In an embodiment the cell sites 104, 114, 194 may provide a wireless link to the UE 102, 192 according to a long term evolution (LTE), a code division multiple access (CDMA), a global system for mobile communication (GSM), or a worldwide interoperability for microwave access (WiMAX) wireless telecommunication protocol. The cell sites 104, 114, 194 may provide a wireless link to the UE 102, 192 according to a 5G wireless telecommunication protocol. The network 115 may be one or more public networks, one or more private networks, or a combination thereof. The cell site 194 may be located anywhere and not proximate to a subway entrance 106, 112. The UEs 192 may be located anywhere and not proximate to or in the subway 108. The UEs 192 may be like the UE 170 described with reference to FIG. 4A or like the UE 170 described with reference to FIG. 4B.

The system 100 further comprises a data store 116 that stores a plurality of type 1 location data 180 and a plurality of type 2 location data 181, a server computer 117 that executes an analysis application 118, and a results data store 119. In an embodiment, the data store 116 may comprise a plurality of location data 180, 181 from each of tens of millions of UEs 170. The analysis application 118 may process the location data 180, 181 periodically, for example daily, weekly, quarterly, twice a year, or on some other periodic time interval. In an embodiment, the analysis application 118 may process the type 1 location data 180 at a different periodic rate than the periodic rate on which it processes type 2 location data 181. In an embodiment, the analysis application 118 may process a portion of the type 1 location data 180 at a first periodic rate and both the type 2 location data 181 and a different portion of the type 1 location data at a second periodic rate. For example, the analysis application 118 may process SSID 188 and beacon ID 189 portions of the type 1 location data 180 at the first periodic rate and may process the location 186 portion of the type 1 location data 180 and the type 2 location data 181 at the second periodic rate.

The analysis application 118 processes the location data 180, 181 to determine counts of intersections of the UEs 170 with POIs 164 located in the subway 108. These counts of intersections of UEs 170 with POIs 164 may be at least partially based on probabilistic calculations that rely upon determining the ratios or fractions of times different paths are taken by a sample set of UEs 170 between two subway entrances 106, 112. The sample set of UEs 170 may be selected from the UEs 170 that have the location SDK 177 installed. The counts of intersections of the UEs 170 may be stored in the results data store 119. The counts of intersections of the UEs 170 with POIs 164 may be further analyzed by the analysis application 118 to derive other statistics such as rates of intersections for different units of time, counts according to different time periods (hourly periods or other portions of a day) and these statistics may be stored in the results data store 119.

Figure 7A:
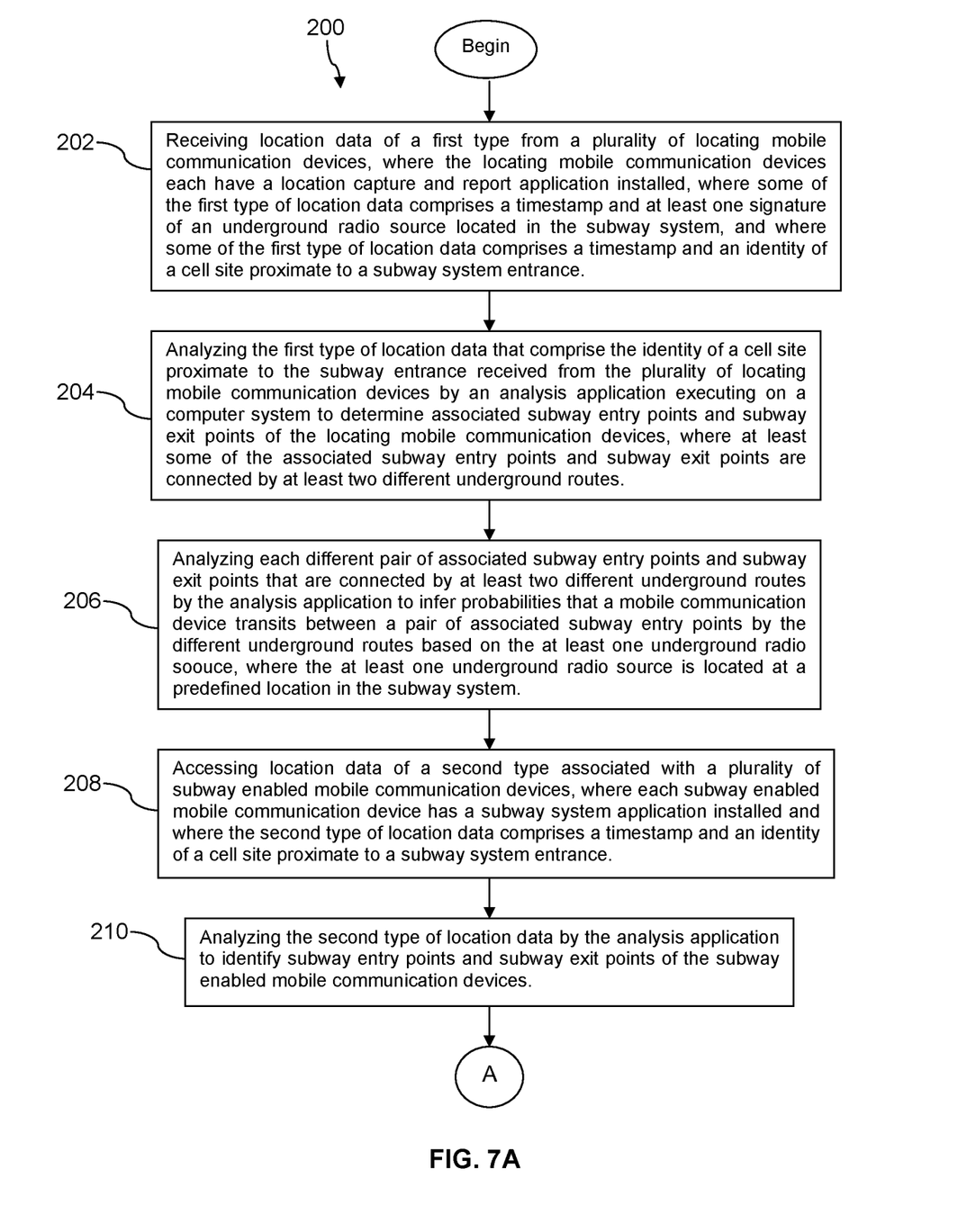
FIG. 7A and FIG. 7B is a flow chart of a method according to an embodiment of the disclosure.
Figure 7B:
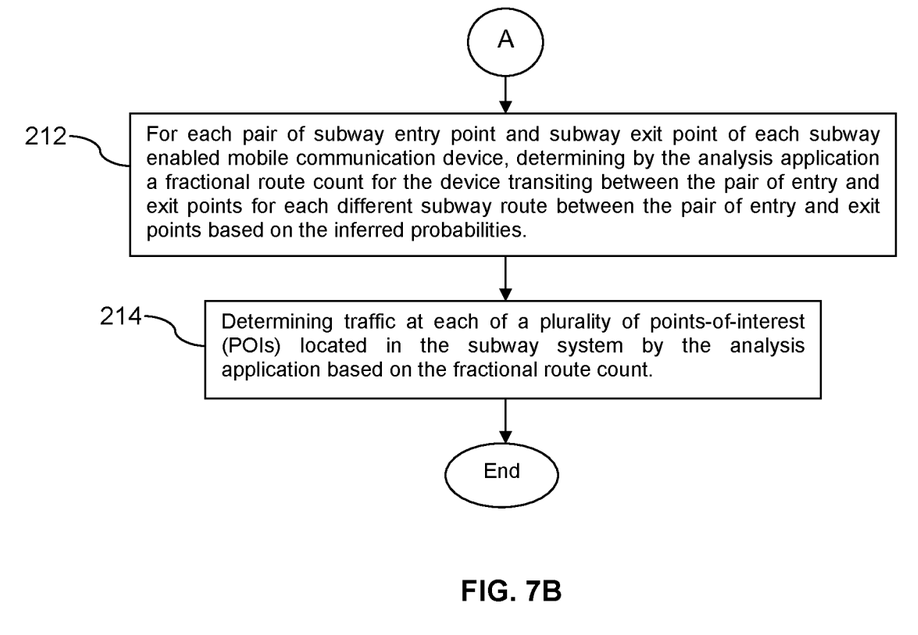

Turning now to FIG. 7A and FIG. 7B, a method 200 is described. In an embodiment, the method 200 is a method of analyzing location data received from locating mobile communication devices to infer probabilities of taking different subway routes when transiting from a first subway entrance to a second subway entrance and analyzing location data from subway enabled mobile communication devices based on the inferred probabilities to determine traffic at points-of-interest in a subway system.

At block 202, the method 200 comprises receiving location data of a first type from a plurality of locating mobile communication devices, where the locating mobile communication devices each have a location capture and report application installed, where some of the first type of location data comprises a timestamp and at least one signature of an underground radio source located in the subway system, and where some of the first type of location data comprises a timestamp and an identity of a cell site proximate to a subway system entrance. In an embodiment, the locating mobile communication devices may be configured like the UE 170 as described above with reference to FIG. 4A. In an embodiment, the first type of location data may be structured like the type 1 location data 180 described above with reference to FIG. 5A. In an embodiment, the first type of location data may be stored in the location data store 116 described above with reference to FIG. 6. The underground radio source may be a WiFi access point located in the subway system underground. The underground radio source may be a radio beacon located in the subway system underground, for example a radio beacon affixed to or proximate to a POI or to a poster. The underground radio source may be a an underground cell site associated with an underground cellular RAN, where the underground cellular RAN is independent from an above ground cellular RAN. The underground radio source may be a radio emitter associated with infrastructure of the subway system.

At block 204, the method 200 comprises analyzing the first type of location data that comprise the identity of a cell site proximate to the subway entrance received from the plurality of locating mobile communication devices by an analysis application executing on a computer system to determine associated subway entry points and subway exit points of the locating mobile communication devices, where at least some of the associated subway entry points and subway exit points are connected by at least two different underground routes. In an embodiment, the analysis application 118 executing on the server 117 performs the processing of block 204.

At block 206, the method 200 comprises analyzing each different pair of associated subway entry points and subway exit points that are connected by at least two different underground routes by the analysis application to infer probabilities that a mobile communication device transits between a pair of associated subway entry points by the different underground routes based on the at least one underground radio source, where the at least one underground radio source is located at a predefined location in the subway system.

At block 208, the method 200 comprises accessing location data of a second type associated with a plurality of subway enabled mobile communication devices, where each subway enabled mobile communication device has a subway system application installed and where the second type of location data comprises a timestamp and an identity of a cell site proximate to a subway system entrance. In an embodiment, the subway enabled mobile communication devices may be configured like the UE 170 as described above with reference to FIG. 4B. In an embodiment, the second type of location data may be structured like the type 2 location data 181 described above with reference to FIG. 5B. The location data of the second type may be created by a different application executing on a server computer that analyzes information flowing to the server from cell sites 104, 114, 194, for example based on trilateration techniques, based on known locations of cell sites 104, 114, 194, or based on another locating technique. The location data of the second type may be stored in the location data store 116 described above with reference to FIG. 6.

At block 210, the method 200 comprises analyzing the second type of location data by the analysis application to identify subway entry points and subway exit points of the subway enabled mobile communication devices. At block 212, the method 200 comprises for each pair of subway entry point and subway exit point of each subway enabled mobile communication device, determining by the analysis application a fractional route count for the device transiting between the pair of entry and exit points for each different subway route between the pair of entry and exit points based on the inferred probabilities.

At block 214, the method 200 comprises determining traffic at each of a plurality of points-of-interest (POIs) located in the subway system by the analysis application based on the fractional route count. For example, the POIs may be like the POI 164 described above with reference to FIG. 3.

Figure 8:
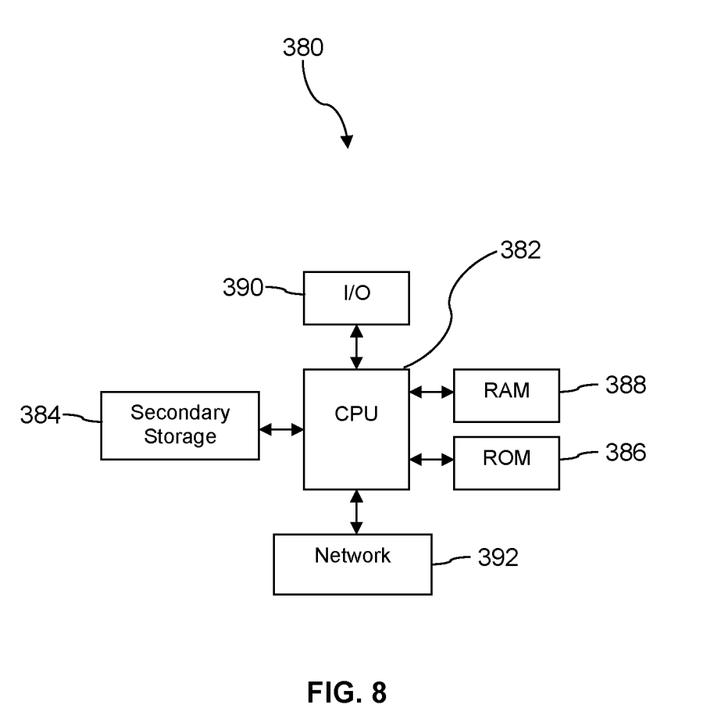
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of analyzing location data received from locating mobile communication devices to infer probabilities of taking different subway routes when transiting from a first subway entrance to a second subway entrance and analyzing location data from subway enabled mobile communication devices based on the inferred probabilities to determine traffic at points-of-interest in a subway system, comprising:

receiving location data of a first type from a plurality of locating mobile communication devices, where the locating mobile communication devices each have a location capture and report application installed, where some of the first type of location data comprises a timestamp and at least one signature of an underground radio source located in the subway system, and where some of the first type of location data comprises a timestamp and an identity of a cell site proximate to a subway system entrance;

analyzing the first type of location data that comprise the identity of a cell site proximate to the subway entrance received from the plurality of locating mobile communication devices by an analysis application executing on a computer system to determine associated subway entry points and subway exit points of the locating mobile communication devices, where at least some of the associated subway entry points and subway exit points are connected by at least two different underground routes;

analyzing each different pair of associated subway entry points and subway exit points that are connected by at least two different underground routes by the analysis application to infer probabilities that a mobile communication device transits between a pair of associated subway entry points by the different underground routes based on the signature of the at least one underground radio source, where the at least one underground radio source is located at a predefined location in the subway system;

accessing location data of a second type associated with a plurality of subway enabled mobile communication devices, where each subway enabled mobile communication device has a subway system application installed and where the second type of location data comprises a timestamp and an identity of a cell site proximate to a subway system entrance;

analyzing the second type of location data by the analysis application to identify subway entry points and subway exit points of the subway enabled mobile communication devices;

for each pair of subway entry point and subway exit point of each subway enabled mobile communication device, determining by the analysis application a fractional route count for the device transiting between the pair of entry and exit points for each different subway route between the pair of entry and exit points based on the inferred probabilities; and determining traffic at each of a plurality of points-of-interest (POIs) located in the subway system by the analysis application based on the fractional route count.

2. The method of claim 1, where the at least one signature of an underground radio source comprises at least one service station identity (SSID) of a WiFi access point (AP), and where the at least one WiFi AP is located at a predefined location in the subway system.

3. The method of claim 1, where the at least one signature of an underground radio source comprises one of an identity, a radio frequency range, or a radio protocol of an at least one radio emitter associated with infrastructure of the subway system, and where the at least one radio emitter is located at a predefined location in the subway system.

4. The method of claim 1, where the at least one signature of an underground radio source comprises at least one identity of an underground cell site associated with an underground cellular radio access network (RAN), where the underground cellular RAN is independent from an above ground cellular RAN, and where the at least one underground cell site is located at a predefined location in the subway system.

5. The method of claim 1, wherein analyzing each different pair of associated subway entry points and subway exit points that are connected by at least two different underground routes by the analysis application to infer probabilities that a mobile communication device transits between a pair of associated subway entry points by the different underground routes is further based on wireless beacon identities of the first type of location data, where the wireless beacons are located at predefined locations in the subway system.

6. The method of claim 1, wherein the location capture and report application stores the first type of location data on the locating mobile communication device and periodically transmits the stored location data when the locating mobile communication device is in cellular radio coverage.

7. The method of claim 1, wherein the second type of location data is generated by an application executing on a computer system based on information flowing to the computer system from a plurality of cell sites.

8. A system for analyzing location data received from locating mobile communication devices to infer probabilities of taking different subway routes when transiting from a first subway entrance to a second subway entrance and analyzing location data from subway enabled mobile communication devices based on the inferred probabilities to determine traffic at points-of-interest in a subway system, comprising:
  at least one processor;
  a non-transitory memory;
  a data store:
    comprising location data of a first type associated to a plurality of locating mobile communication devices, where the locating mobile communication devices each have a location capture and report application installed, where some of the first type of location data comprises a timestamp and at least one service station identity (SSID) of a WiFi access point (AP) located in the subway system and where some of the first type of location data comprises a timestamp and an identity of a cell site proximate to a subway system entrance; and
    comprising location data of a second type associated with a plurality of subway enabled mobile communication devices, where each subway enabled mobile communication device has a subway system application installed and where the second type of location data comprises a timestamp and an identity of a cell site proximate to a subway system entrance; and
  an analysis application stored in the non-transitory memory that, when executed,
    analyzes the first type of location data that comprise the identity of a cell site proximate to the subway entrance received from the plurality of locating mobile communication devices to determine associated subway entry points and subway exit points of the locating mobile communication devices, where at least some of the associated subway entry points and subway exit points are connected by at least two different underground routes,
    analyzes each different pair of associated subway entry points and subway exit points that are connected by at least two different underground routes to infer probabilities that a mobile communication device transits between a pair of associated subway entry points by the different underground routes based on SSIDs of WiFi APs of the first type of location data, where the WiFi APs are located at predefined locations in the subway system,
    analyzes the second type of location data to identify subway entry points and subway exit points of the subway enabled mobile communication devices,
    for each pair of subway entry point and subway exit point of each subway enabled mobile communication device, determines a fractional route count for the device transiting between the pair of entry and exit points for each different subway route between the pair of entry and exit points based on the inferred probabilities, and
    determines traffic at each of a plurality of points-of-interest (POIs) located in the subway system based on the fractional route count.

9. The system of claim 8, wherein the location mobile communication devices and the subway enabled mobile communication devices each are a device selected from a list consisting of a smart phone, a mobile phone, a personal digital assistant (PDA), a headset computer, a wearable computer, a laptop computer, a notebook computer, and a tablet computer.

10. The system of claim 8, wherein analyzing each different pair of associated subway entry points and subway exit points that are connected by at least two different underground routes by the analysis application to infer probabilities that a mobile communication device transits between a pair of associated subway entry points by the different underground routes is further based on wireless beacon identities of the first type of location data, where the wireless beacons are located at predefined locations in the subway system.

11. The system of claim 8, wherein the location capture and report application stores the first type of location data on the locating mobile communication device and periodically transmits the stored location data when the locating mobile communication device is in cellular radio coverage.

12. The system of claim 8, wherein the second type of location data is generated by an application executing on a computer system based on information flowing to the computer system from a plurality of cell sites.

13. The system of claim 12, wherein the second type of location data is generated based on applying trilateration techniques to the information flowing to the computer system from the cell sites.

14. The system of claim 12, wherein the second type of location data is generated based on using a known location of the cell sites as a proxy for a location of the subway enabled mobile communication devices.

15. A method of analyzing location data received from locating mobile communication devices to infer probabilities of taking different subway routes when transiting from a first subway entrance to a second subway entrance and analyzing location data from subway enabled mobile communication devices based on the inferred probabilities to determine traffic at points-of-interest in a subway system, comprising:
  analyzing a first type of location data associated with mobile communication devices that comprise an identity of a cell site proximate to a subway entrance by an analysis application executing on a computer system to determine associated subway entry points and subway exit points of the mobile communication devices;
  analyzing different pairs of associated subway entry points and subway exit points by the analysis application to infer probabilities that a mobile communication device transits between a pair of associated subway entry points by different underground routes based on an SSID of a WiFi AP included in the first type of location data, where the WiFi APs are located at predefined locations in the subway system;
  analyzing a second type of location data associated with mobile communication devices by the analysis application to identify subway entry points and subway exit points of the mobile communication devices based on a cell site identity included in the second type of location data;
  for each pair of subway entry point and subway exit point associated with the second type of location data, determining by the analysis application a fractional route count for the device transiting between the pair of entry and exit points for each different subway route between the pair of entry and exit points based on the inferred probabilities; and determining traffic at each of a plurality of points-of-interest (POIs) located in the subway system by the analysis application based on the fractional route count.

16. The method of claim 15, wherein the second type of location data are associated with mobile communication devices that have a subway application installed.

17. The method of claim 15, wherein the first type of location data are associated with mobile communication devices that have a location capture and report application installed.

18. The method of claim 15, wherein the mobile communication devices are a smart phone, a mobile phone, a personal digital assistant (PDA), a headset computer, a wearable computer, a laptop computer, a notebook computer, or a tablet computer.

19. The method of claim 15, wherein analyzing different pairs of associated subway entry points and subway exit points by the analysis application to infer probabilities that a mobile communication device transits between a pair of associated subway entry points by different underground routes is further based on wireless beacon identities of the first type of location data, where the wireless beacons are located at predefined locations in the subway system.

20. The method of claim 15, wherein the second type of location data is generated by an application executing on a computer system based on information flowing to the computer system from a plurality of cell sites.

\* \* \* \* \*